3,041,299
PROCESS FOR PREPARING SYNTHETIC RUBBER-ASPHALT COMPOSITIONS AND COMPOSITION PREPARED THEREBY
Felix C. Gzemski, Glen Mills, and Robert C. Taylor, King of Prussia, Pa., assignors to The Atlantic Refining Company, Philadelphia, Pa., a corporation of Pennsylvania
No Drawing. Filed Oct. 23, 1959, Ser. No. 848,232
3 Claims. (Cl. 260—28.5)

This invention relates to a process for preparing synthetic rubber-asphalt cutback compositions and to the novel composition prepared by such process. In particular, this invention relates to a process for preparing synthetic rubber-asphalt cutback compositions by subjecting a mixture of an asphalt cutback and a rubber latex to conditions of high shear.

In recent years numerous advantages have been found for incorporating rubber, particularly synthetic rubber, into asphalts. The rubber gives the asphalt elasticity, increases its ductility, and reduces its susceptibility to temperature changes. The extent to which these advantages can be realized, however, depends upon the extent to which the rubber is dissolved or dispersed in the asphalt. During the development of rubber-asphalt paving compositions, crumb rubber was incorporated during the mixing of asphalt and aggregate. This was such a difficult operation that the process did not advance much beyond the experimental stage. Subsequently it was proposed first to coat the aggregate with the asphalt and thereafter add latex to the hot mixture with constant mixing in order to incorporate the rubber into the asphalt. This process required exceedingly close temperature control in order that the rubberized asphalt would retain its desired elasticity and, moreover, it was exceedingly difficult and required long mixing times to obtain a uniform mixture of the asphalt and rubber with the aggregate. In another method it was proposed to prepare asphalt-rubber blends in the absence of a mineral aggregate by adding a rubber latex to a molten supply of asphalt under exceedingly carefully controlled conditions of temperature and rate of addition such that foaming and splattering would be minimized as the water from the latex was flashed from the mixture by contact with the hot asphalt. This method also had many disadvantages inherently present whenever water is allowed to come into contact with hot asphalt.

A method now has been found, however, whereby synthetic rubber may be incorporated readily into asphalt in the form of an asphalt cutback to produce a stable composition wherein the rubberized asphalt retains all of its advantages of elasticity, increased ductility, and reduced temperature susceptibility together with the unexpected advantage not heretofore realized of increased adhesivity to mineral aggregates. These properties render the compositions of this invention particularly useful in the manufacture of asphalt paving.

It is an object of this invention to provide a process for preparing synthetic rubber-asphalt cutback compositions.

It is another object of this invention to provide a process for preparing synthetic rubber-asphalt cutback compositions from a mixture of a synthetic rubber latex and an asphalt cutback.

It is another object of this invention to provide a novel synthetic rubber-asphalt cutback composition wherein the rubberized asphalt has increased adhesivity for mineral aggregates.

Other objects and advantages of this invention will be apparent from the detailed description and claims that follow.

In accordance with this invention a synthetic rubber latex, particularly one of those produced by emulsion polymerization processes, in admixture with an asphalt cutback is subjected to conditions of high shear such as in a colloid mill to produce a stable composition consisting of an emulsion in which the asphalt cutback constitutes the dispersion medium for the rubber and the water that was contained in the latex. It has been found that it is not possible to produce stable compositions with natural rubber latices even when using conditions of high shear, hence this invention is limited to synthetic rubber-asphalt cutback compositions.

The synthetic rubber latex emulsions contain various conventional compounds such as surface active agents, polymerization catalysts such as cumene hydroperoxide, short stop materials such as di-tertiary-butyl hydroquinone and similar compounds, all of which are present in small amounts. The surface active agents may consist of emulsifiers comprising the salts or acids of natural esters such as potassium stearate, potassium-processed rosin, polyalkylene oxide dioleates, sorbitan trioleate, and the like, or such surface active agents may be synthetics such as the alkyl aryl sulfonates, particularly the alkylbenzene sulfonates, condensed naphthalene-formaldehyde sulfonates, alkylolamides and the like, or non-ionics such as the condensation products of nonyl phenol with ethylene oxide or propylene oxide-ethylene oxide products. These agents apparently not only aid in stabilizing the latex emulsion but in addition promote the stability of the rubber latex-asphalt cutback composition.

The latices may comprise from 15 to 70 weight percent solids and 30 to 85 weight percent water. Latices having solid contents higher and lower than these are occasionally found and are suitable for this invention. The GRS-type rubber latices comprising copolymerized butadiene and styrene may be either those produced by the cold process or the hot process. GRS–2006 comprising approximately 24 percent styrene and 76 percent butadiene, the latex comprising approximately 28 percent rubber and 72 percent water, has been found to be particularly suitable for the process of this invention.

The asphalt cutback may be rapid, medium, or slow curing cutback made from 120–150 penetration at 77° F. (ASTM Method D–5) asphalt, 85–100 penetration asphalt (110° F.–125° F. softening point, ASTM Method D–36), 150° F. softening point asphalt, 190° F. softening point asphalt, and the like. These asphalts are separated from crude petroleum by well known conventional methods. The petroleum distillate solvent employed in producing the asphalt cutback may be any one of the conventional petroleum distillate fractions employed in producing cutbacks such as naphtha, kerosene, or gas oil fractions. These fractions span a boiling range of from about 180° F. to 600° F. For example, a conventional rapid curing cutback is prepared from an 85–100 penetration asphalt by dissolving it in a blending naphtha having a boiling range from 190° F. to 390° F. and a specific gravity of approximately 0.75. The quantity of asphalt constitutes about 82 percent by weight of the blend and the naphtha 18 weight percent.

A medium curing cutback is prepared similarly from an 85–100 penetration asphalt and a somewhat heavier solvent, i.e., a petroleum distillate having a boiling range between 380° F. and 590° F. and a specific gravity of approximately 0.85. Similarly, cutbacks can be made from the various asphalts and solvents which have been mentioned, in various proportions, preferably, however, the solvent should range from 10 to 50 percent by weight and the asphalt from 50 to 90 percent by weight.

It has been found that in order to impart to the asphalt the desired elasticity, flexibility, ductility, and toughness properties it is necessary to incorporate at least 0.5 percent by weight of synthetic rubber based on the weight of the asphalt. Preferably, the amount of rubber should range between 2 and 4 percent by weight based on the weight of the asphalt in the cutback and exceedingly good results have been obtained with compositions wherein the rubber amounted to 3 percent by weight of the asphalt contained in the cutback. Amounts ranging up to 15 percent by weight of rubber based on the weight of the asphalt may be employed. However, amounts in excess of about 15 percent should not be used since the product becomes so highly viscous that it behaves as a solid and cannot be admixed with paving aggregates or utilized for other purposes in the manner of the fluid cutback.

In accordance with the process of this invention the asphalt cutback is heated to a temperature of from 130° F. to 190° F. The temperature should be selected such that the cutback will be reduced in viscosity and be sufficiently fluid whereby its admixture with the latex is facilitated. If a low boiling solvent is employed in the cutback it is preferred to use temperatures in the lower end of the range to avoid rapid vaporization of the solvent from the cutback. Since the latex is ordinarily sufficiently fluid to permit thorough mixing it need not be heated. The heated asphalt cutback and latex may be premixed before being introduced into the zone of high shear or they may be introduced separately to the high shear zone and admixed therein.

Since the latex constitutes the minor portion of the composition it is usually unnecessary to heat the mixture prior to introducing the mixture into the zone of high shear in order to subject the mixture to the high shearing action at the desired temperatures ranging from 130° F. to 190° F. and preferably from 160° F. to 165° F. In the zone of high shear, the asphalt cutback and synthetic rubber latex are subjected to shear rates ranging from $10^4$ reciprocal seconds to $5 \times 10^6$ reciprocal seconds and preferably the shear rate should range from $3 \times 10^4$ reciprocal seconds to $10^6$ reciprocal seconds. In order to obtain these high shear rates it is preferred to employ a colloid mill. Colloid mills which will attain these high shear rates are available commercially. Two commercially available colloid mills have been found to be particularly suitable for the process of this invention. These are a Model G-2 and Model G-3 Charlotte colloid mill manufactured by the Chemi-Colloid Laboratories, Inc., Garden City Park, New York.

It is a critical feature of this invention that the asphalt cutback and synthetic rubber latex be subjected to high shear rates since high shear rates are required to produce stable emulsions of the latex in the asphalt cutback. If low shear rates are employed to incorporate the latex in the asphalt cutback, the emulsion formed is very unstable and the latex phase will separate from the asphalt cutback phase within a matter of days upon standing at 175° F. It then becomes necessary to reprocess the entire mixture before it can be used. On prolonged storage a minor amount of phase separation may occur with the rubber-asphalt cutback composition prepared by the high shear rate process of this invention. This phase separation, however, is very small and is usually only of the order from 1 to 2 weight percent. Moreover, it is unnecessary to reprocess the composition since the material which separates may be readily redispersed by stirring or other mild agitation.

The following examples are provided solely for the purpose of illustrating certain specific embodiments and features of the instant invention. Accordingly it will be understood that the invention is not limited to these illustrative examples.

EXAMPLE I

In order to demonstrate the effect of shear rate on the stability of the composition, three different shear rates were employed to prepare compositions from a specific asphalt cutback and GRS rubber latex. The asphalt cutback consisted of 82 percent by weight of an asphalt having a penetration at 77° F. of 92 and a softening point of 117° F., and 18 percent by weight naphtha having a specific gravity of 0.754 and a boiling range of from 190° F. to 390° F. The rubber latex was GRS-2006 and consisted of a copolymer of 24 percent by weight of styrene, 76 percent by weight of butadiene. The latex consisted of 28 percent by weight of the copolymer and 72 percent by weight of water. Eight percent by weight of the GRS-2006 rubber latex was added to 92 percent by weight of the cutback at temperatures of 160° F. to 165° F. This amount corresponded to approximately 3 percent by weight of rubber based on the weight of the asphalt in the cutback. Portions of this mixture were subjected to three different shear rates in a Model G-3 Charlotte colloid mill. The variation in shear rate was obtained by adjusting the gap between the rotor and stator of the mill. The compositions thus prepared were allowed to stand for two weeks at a temperature of 175° F. after which time the amount of phase separation, i.e., the amount of latex phase separated, was determined by decantation. The conditions and results of these experiments are set forth in Table I.

*Table I*

| Experiment Number | Colloid Mill Gap, Inches | Shear Rate Reciprocal Seconds | Separation after 2 wks. at 175° F., wt. percent |
|---|---|---|---|
| 1 | 0.001 | $1 \times 10^6$ | 0.5 |
| 2 | 0.01 | $1 \times 10^5$ | 1.3 |
| 3 | 0.03 | $3 \times 10^4$ | 1.6 |

It will be noted that as the shear rate decreases the amount of phase separation during storage increases slightly. In each of these cases, however, the material which separated was very readily redispersible by merely stirring the composition.

EXAMPLE II

Additional experiments were carried out to determine the effect on the stability of the composition when the composition was recycled through the colloid mill. The same mixture of asphalt cutback and GRS rubber latex was used in these experiments as was used in Example I and the same colloidal mill also was employed. The conditions, including the number of passes through the colloid mill and the stability of the resulting compositions, are set forth in Table II.

*Table II*

| Experiment Number | Shear Rate, Reciprocal Seconds | No. of Passes Through Mill | Separation after 2 wks. at 175° F., wt. percent |
|---|---|---|---|
| 4 | $1 \times 10^5$ | 1 | 1.3 |
| 4A | $1 \times 10^5$ | 2 | 0.5 |
| 5 | $3 \times 10^4$ | 1 | 2.2 |
| 5A | $3 \times 10^5$ | 5 | 0.9 |

These data show that the stability of the composition is improved if the mixture is passed through the colloid mill more than once.

EXAMPLE III

In order to demonstrate the desirability of a high shear rate as compared with a low shear rate obtained by ordinary mixing, three mixtures of asphalt cutback and rubber latex were processed in the Model G-3 Charlotte colloid mill at a shear rate or $10^6$ reciprocal seconds and by ordinary mixing at shear rates well below $10^4$ reciprocal seconds with a commercial household mixer, i.e., a "Mixmaster," operated at its maximum speed using a one-quart container. The processing temperature in each case ranged from 160° F. to 165° F. The first mixture employed GRS–2000 consisting of 46 percent by weight of styrene, 54 percent by weight butadiene, hot polymer process, with 40 percent by weight rubber and 60 percent by weight water in the latex. The asphalt cutback was the same as the cutback of Example I.

Mixture No. 2 employed GRS–2105 consisting of 46 percent by weight styrene, 54 percent by weight butadiene, cold polymer process, with 62 percent by weight rubber and 38 percent by weight water in the latex. The cuback was the same as that of Example I.

Mixture No. 3 employed GRS–2006 consisting of 24 percent by weight of styrene, 76 percent by weight of butadiene, hot polymer process, with 28 percent by weight of the rubber and 72 percent by weight of water in the latex and the same asphalt cutback as in Example I.

In each case the amount of rubber latex was selected so that the quantity of rubber in the latex corresponded to 3 percent by weight based on the weight of the asphalt in the cutback. The results of these experiments are set forth in Table III.

*Table III*

| Mixture Number | Separation after Two Weeks at 175° F., Weight Percent | |
|---|---|---|
| | Ordinary, low shear mixing | High Shear, 10⁶ Reciprocal Seconds |
| 1 | 20.0 (in one week) | 1.3 |
| 2 | 10.0 (in one week) | 2.5 |
| 3 | 6.2 | 1.7 |

These data demonstrate that high shear rates must be employed in order to produce a stable composition in accordance with the teachings of this invention.

EXAMPLE IV

The cutback of Example I was mixed with a GRS–2004 latex consisting of 59 percent by weight of rubber, 41 percent by weight of water, the rubber portion being 100 percent by weight butadiene polymer. The quantity of latex was selected such that the rubber amounted to 3 percent by weight based on the amount of asphalt in the cutback. This mixture was subjected to high shear conditions at a temperature of approximately 160° F. and the resulting composition was found to have a good stability. A second mixture was prepared similar to the first mixture of this example except that Neoprene 735 latex consisting of 38 percent by weight of rubber, 62 percent by weight of water were utilized instead of the GRS latex. This composition after being subjected to the high shear conditions likewise exhibited a satisfactory stability.

EXAMPLE V

The physical properties of the composition prepared according to experiment No. 1 of Example I were compared with the physical properties of the asphalt cutback employed to prepare the composition of experiment No. 1. The cutback had a specific gravity of 0.95 and a viscosity at 140° F. of 127 Saybolt Furol seconds. The rubber containing composition had a specific gravity of 0.969 and a viscosity at 140° F. of 223 Saybolt Furol seconds. Thus, the rubber-asphalt cutback composition has a slightly higher specific gravity and a considerably higher viscosity than the original cutback.

The composition of Experiment 1 of Example I was then distilled to remove the water and naphtha solvent leaving a residue comprising the rubber in the asphalt. The solvent naphtha was likewise distilled from a portion of the same cutback employed in the preparation of the rubber-asphalt cutback composition. The various physical properties of these distillation residues are compared in Table IV.

*Table IV*

| Properties of Distillation Residue | Asphalt, no rubber | Asphalt and 3% rubber |
|---|---|---|
| Softening point, ° F. (R & B, ASTM, D–36) | 116 | 121 |
| Penetration at: | | |
| 39.2° F. (ASTM, D–5, 200 g., 60 sec.) | 27 | 44 |
| 77.0° F. (ASTM, D–5, 100 g., 5 sec.) | 106 | 113 |
| Temperature susceptibility, Pen. 39.2° F./Pen. 77.0° F. | .26 | .39 |
| Ductility at: | | |
| 39.2° F., cm. (5 cm./min.) (ASTM, D–113) | 10 | 150+ |
| 77.0° F., cm. (5 cm./min.) (ASTM, D–113) | 150+ | 150+ |

These data show that the asphalt-rubber composition has superior ductility and temperature susceptibility properties as compared with the base asphalt. Moreover, it was found that the asphalt-rubber composition pulled out into rubbery strands that elastically retracted when released. The asphalt, of course, did not exhibit this property in any manner. Impact tests on the rubberized asphalt showed it to have far less brittleness than ordinary asphalt. During the ductility tests on the rubberized asphalt the composition pulled out into much thicker strands as compared with asphalt only showing that the rubberized asphalt has greater toughness.

EXAMPLE VI

In order to determine the utility of the synthetic rubber-asphalt cutback compositions of this invention, portions of the composition prepared in Experiment No. 1 of Example I were tested for their ability to coat stone aggregate (Pennsylvania sandstone) of the type used in asphalt paving construction. These tests were carried out in accordance with the detailed procedure set forth in the publication of the Pennsylvania State Highway Department "Special Specifications for Treated Bituminous Materials, Supplementing Bulletin 25, Revised January 1957." For comparison the same tests were carried out on the asphalt cutback employed in the preparation of the rubber-asphalt cutback. The results of these tests are set forth in Table V.

*Table V*

| COMPOSITION | Percent of the Coating Retained on the Aggregate | | |
|---|---|---|---|
| | Static test | Stripping test | Wet Aggregate Test |
| Asphalt cutback | 90 | 10 | 30 |
| Rubber-asphalt cutback | 99 | 70 | 60 |

The results demonstrate that the synthetic rubber-asphalt cutback compositions produced by the process of this invention are useful as paving compositions and are markedly superior with respect to their adhesivity for aggregates as compared with asphalt cutbacks not containing rubber. The synthetic rubber-asphalt cutback compositions of this invention are also useful in the same applications in which asphalt cutbacks without the rubber are employed, for example, as roofing coatings, pipe coatings, undercoatings for railway cars and automobiles and the like. In addition, various additives may be included in the synthetic rubber-asphalt cutback compositions of this invention including stone coating additives and the like. These additives may be added to the latex, to the cutback or to the rubber-asphalt cutback composition.

We claim:

1. A process for preparing a synthetic rubber-asphalt cutback composition which consists of mixing an asphalt cutback consisting of from 50 percent to 90 percent by weight of asphalt ranging in hardness from 150 penetration at 77° F. to 190° F. softening point and from 10 percent to 50 percent by weight of a petroleum distillate boiling in the range from about 180° F. to 600° F. with a synthetic rubber latex, said rubber being selected from the group consisting of polymers of chloroprene, polymers of butadiene, and copolymers of butadiene and styrene, the quantity of the rubber in the latex ranging from 0.5 to 15.0 percent by weight based on the weight of the asphalt in the cutback, and subjecting the mixture at temperatures ranging from 130° F. to 190° F to conditions of high shear, ranging in rate from $10^4$ reciprocal seconds to $5 \times 10^6$ reciprocal seconds.

2. A process for preparing a synthetic rubber-asphalt cutback composition which consists of mixing an asphalt cutback consisting of from 50 percent to 90 percent by weight of asphalt ranging in hardness from 150 penetration at 77° F. to 190° F. softening point and from 10 percent to 50 percent by weight of a petroleum distillate boiling in the range from about 180° F. to 600° F. with a synthetic rubber latex, said rubber being selected from the group consisting of polymers of chloroprene, polymers of butadiene, and copolymers of butadiene and styrene, the quantity of the rubber in the latex ranging from 0.5 to 15.0 percent by weight based on the weight of the asphalt in the cutback and subjecting the mixture at temperatures ranging from 160° F. to 165° F. to conditions of high shear ranging in rate from $3 \times 10^4$ reciprocal seconds to $10^6$ reciprocal seconds.

3. A process for preparing a synthetic rubber-asphalt cutback composition which consists of mixing an asphalt cutback consisting of from 50 percent to 90 percent by weight of asphalt ranging in hardness from 150 penetration at 77° F. to 190° F. softening point and from 10 percent to 50 percent by weight of a petroleum distillate boiling in the range from about 180° F. to 600° F. with a synthetic rubber latex, said rubber being selected from the group consisting of polymers of chloroprene, polymers of butadiene, and copolymers of butadiene and styrene, the quantity of the rubber in the latex ranging from 2.0 to 4.0 percent by weight based on the weight of the asphalt in the cutback and subjecting the mixture at temperatures ranging from 160° F. to 165° F. to conditions of high shear ranging in rate from $3 \times 10^4$ reciprocal seconds to $10^6$ reciprocal seconds.

References Cited in the file of this patent

UNITED STATES PATENTS

| | | |
|---|---|---|
| 2,509,777 | McMillan et al. | May 30, 1950 |
| 2,537,190 | Lankau et al. | Jan. 9, 1951 |
| 2,921,313 | Odasz | Jan. 12, 1960 |